United States Patent [19]
Maki

[11] Patent Number: 5,810,428
[45] Date of Patent: Sep. 22, 1998

[54] FRAMEWORK OF VEHICLE BODY STRUCTURE

[75] Inventor: Tetsuo Maki, Yokosuka, Japan

[73] Assignee: Nissan Motor Co., Ltd., Yokohama, Japan

[21] Appl. No.: 791,408

[22] Filed: Jan. 30, 1997

Related U.S. Application Data

[63] Continuation of Ser. No. 491,818, Jun. 19, 1995, abandoned.

[30] Foreign Application Priority Data

Jul. 15, 1994 [JP] Japan .................................. 6-164114

[51] Int. Cl.$^6$ .................................................. B62D 25/08
[52] U.S. Cl. ...................... 296/203.02; 296/205; 296/194
[58] Field of Search .................................. 296/205, 203, 296/30, 201, 96.21, 188, 189, 194

[56] References Cited

U.S. PATENT DOCUMENTS

| | | | |
|---|---|---|---|
| 4,969,680 | 11/1990 | Shimoda | 296/146 |
| 4,973,103 | 11/1990 | Imajyo et al. | 296/195 |
| 5,042,872 | 8/1991 | Yoshii | 296/203 |
| 5,052,742 | 10/1991 | Akoshima et al. | 296/192 |
| 5,269,585 | 12/1993 | Klages et al. | 296/205 |
| 5,443,297 | 8/1995 | Tanaka et al. | 296/203 |

FOREIGN PATENT DOCUMENTS

63-105575  7/1988  Japan .
63-112957  7/1988  Japan .

Primary Examiner—Joseph D. Pape
Attorney, Agent, or Firm—Foley & Lardner

[57] ABSTRACT

A framework of a vehicle body structure comprises an outer panel and an inner panel. These outer and inner panels are joined to constitute a longitudinally extending hollow structure. The inner panel includes a center panel part facing toward the interior of the vehicle body, and first and second side panel parts extending obliquely outward from laterally opposed edges of the center panel part. The center panel part has a rigidity higher than each of the first and second side panel parts.

18 Claims, 11 Drawing Sheets

FRAMEWORK OF VEHICLE BODY STRUCTURE

This application is a continuation of application Ser. No. 08/491,818, filed Jun. 19, 1995, now abandoned.

BACKGROUND OF THE INVENTION

1. Field of the Invention

The present invention relates in general to a body structure of a motor vehicle, and more particularly to frameworks of the body vehicle structure, such as front pillars, center pillars, roof rails and the like.

2. Description of the Prior Art

Frameworks of a vehicle body structure, such as front pillars, center pillars, roof rails and the like, are constructed to have a longitudinally extending hollow structure for increasing the mechanical strength of the vehicle body, which has torsional rigidity, flexural rigidity or the like. Usually, the frameworks comprise an outer panel and an inner panel joined to constitute the hollow structure. Due to excellency in torsional rigidity and flexural rigidity 6f such hollow structure, the vehicle body can have a high mechanical strength.

One of the conventional frameworks of such type is a front pillar which is disclosed in Japanese Utility Model First Provisional Publication 63-105575. In the front pillar of this publication, two elements are used as parts of the inner panel. That is, for construction of the inner panel, one element is put on the other and they are spot-welded at their mating portions. With this, the inner panel has a layered structure, which provides the assembled front pillar with a higher mechanical strength. Other conventional frameworks are a center pillar disclosed in Japanese Utility Model First Provisional Publication 63-112957. In the center pillar of this publication, respective reinforcing plates are welded to inner surfaces of the outer and inner panels, and the two reinforcing plates are united by another reinforcing plate. With this, both the outer and inner panels have a layered structure, which provides the assembled center pillar with a higher mechanical strength.

In the former framework, the two welded elements for the inner panel are neatly covered with an interior finish such as a garnish or the like when the associated vehicle is put on the market. Thus, the increase in mechanical strength of the front pillar is achieved without sacrificing the external appearance of the same. Furthermore, in the latter framework, the reinforcing plates used are entirely received in the center pillar. Thus, also in this framework, the increase in mechanical strength of the center pillar is achieved without lowering the external appearance of the same.

The above-mentioned conventional frameworks have aimed to increase the rigidity of the pillars and attained the aim by merely doubling the panel. Thus, when a vehicle collision occurs, a shock absorbing area of the panel, against which a passenger makes a secondary collision, is decreased by such doubled panel structure.

SUMMARY OF THE INVENTION

It is therefore an object of the present invention to provide a framework of a vehicle body, which comprises an inner panel whose outer surface is polygonal in shape for obtaining an optimum positional arrangement thereof relative to a passenger in the vehicle.

It is another object of the present invention to provide a framework of a vehicle body, which comprises a polygonal inner panel whose walls are suitably balanced in mechanical strength thereby to assure a sufficient shock absorbing deformation of the inner panel.

According to the present invention, there is provided a framework of a vehicle body structure, which comprises an outer panel; and an inner panel joined with the outer panel to constitute a longitudinally extending hollow structure, the inner panel including a flat center panel part facing toward the interior of the vehicle body, and first and second side panel parts extending obliquely outwardly from laterally opposed edges of the center panel part, wherein the center panel part has a rigidity higher than each of the first and second side panel parts.

DETAILED DESCRIPTION OF THE EMBODIMENTS

In the following, embodiments of the present invention will be described in detail with reference to the drawings.

Figure 4:
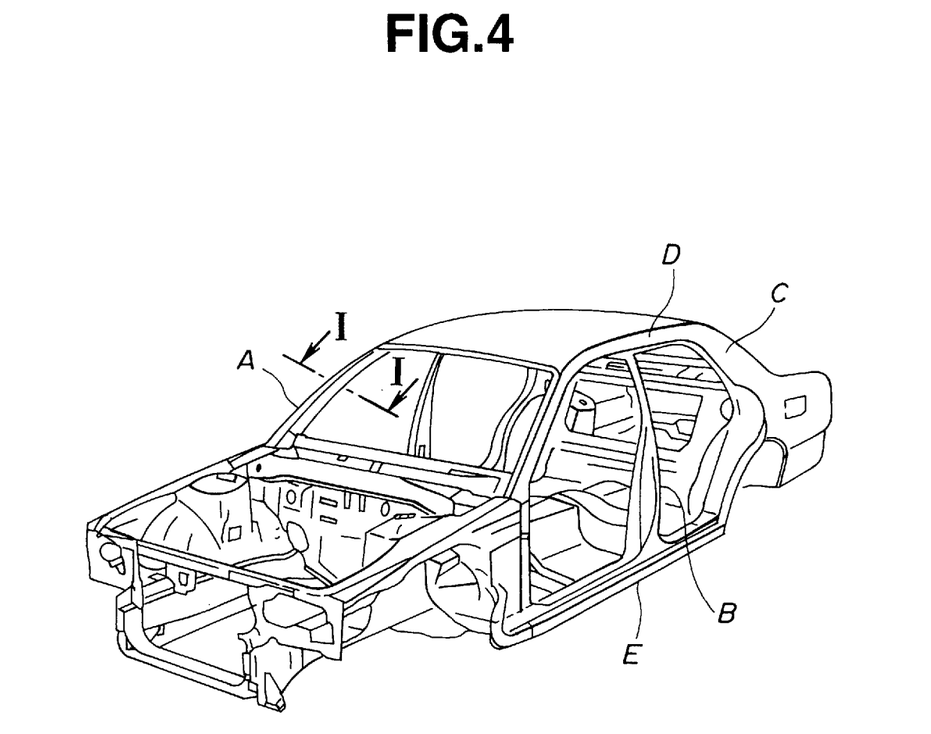
FIG. 4 is a perspective view of a monocoque vehicle body to which the present invention can be practically applied.

For ease of understanding, the description will be commenced with respect to FIG. 4 that shows a monocoque vehicle body to which the present invention can be applied.

Designated by references "A", "B", "C", "D" and "E" are a front pillar, a center pillar, a rear pillar, a roof rail and a side sill, which are frameworks of the vehicle body.

As will become apparent as the description proceeds, the present invention is practically applied to upper frameworks, such as, the front pillar "A", center pillar "B", rear pillar "C"

and roof rail "D". More specifically, in the front, center and rear pillars "A", "B" and "C", the present invention is directly applied to an upper half part of them, with respect to the waist line of the vehicle body.

Figure 1:
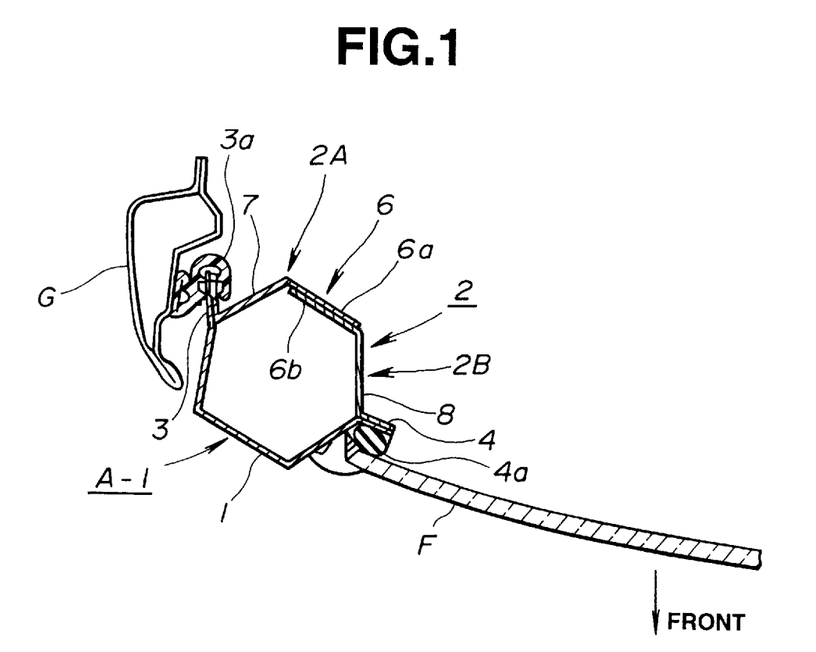
FIG. 1 is a sectional view of a front pillar of a vehicle body structure, which is taken along the line I—I of an after-mentioned FIG. 4, the front pillar being a first embodiment of the present invention.
Figure 2:
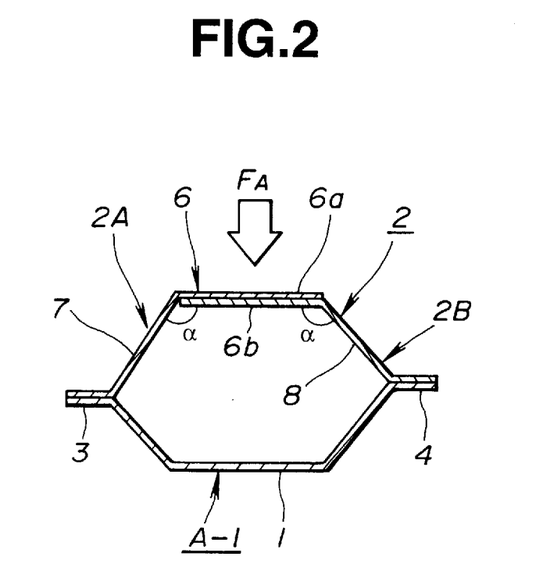
FIG. 2 is an enlarged sectional view of the front pillar of FIG. 1.
Figure 3:
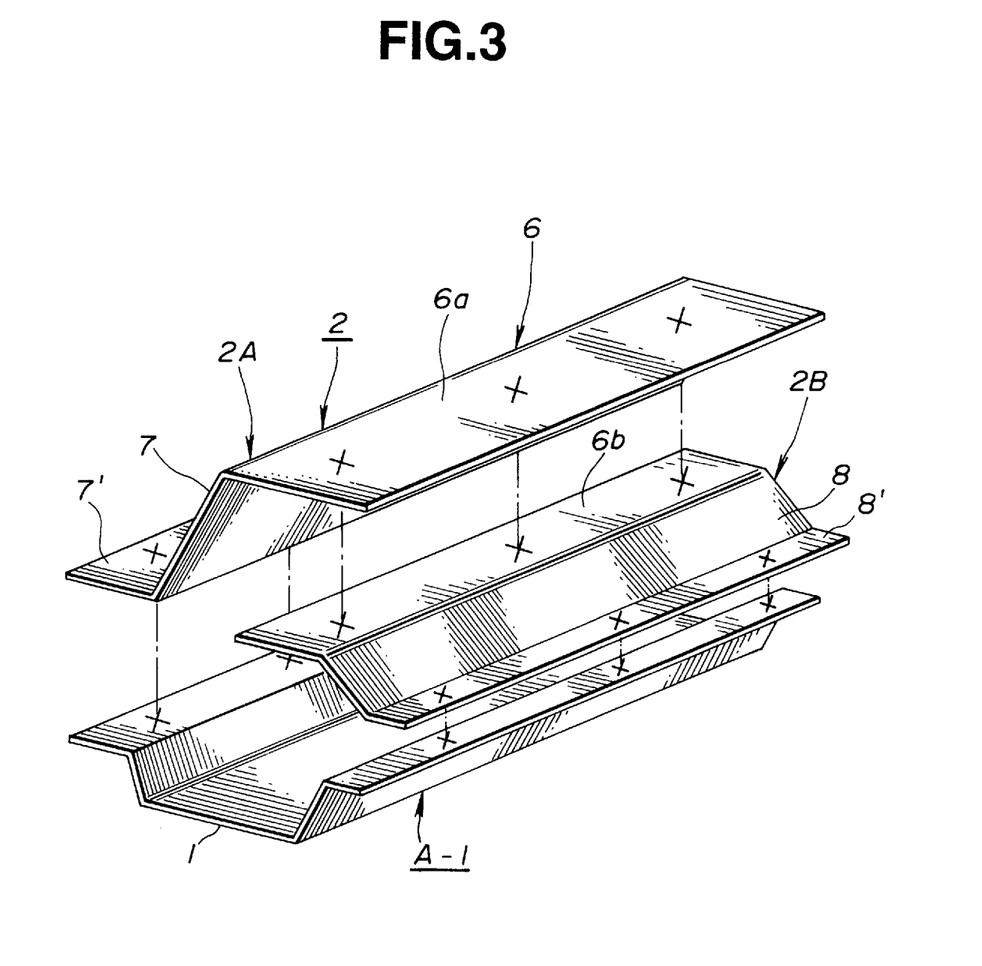
FIG. 3 is an exploded view of the front pillar of the first embodiment.

Referring to FIGS. 1 to 3, there is shown a first embodiment of the present invention, which is a front pillar "A-1" of the vehicle body.

The front pillar "A-1" comprises an outer panel 1 and an inner panel 2 welded at their flanges 3 and 4 to constitute a tubular construction or longitudinally extending hollow structure. The panels 1 and 2 are constructed of a steel plate.

As is seen from FIG. 1, upon assembly, the front flange 4 of the front pillar "A-1" serves to support via a seal 4a a lateral edge of a windshield "F" of the motor vehicle, and the rear flange 3 of the pillar "A-1" serves to hold a weather strip 3a. As is understood from FIGS. 4 and 1, a window frame of a front right door of the vehicle is pressed against the weather strip 3a when the door assumes its closed position.

As is best shown in FIG. 2, the inner panel 2 comprises a center panel part 6 and two inclined side panel parts 7 and 8. The center panel part 6 is substantially flat in construction and faces toward the interior of the vehicle body. The side panel parts 7 and 8 are connected with and extend along opposed side edges of the center panel part 6, so that the inner panel 2 has a generally U-shaped cross section.

As will be described in the following, the center panel part 6 is constructed to have a higher rigidity, and the two side panel parts 7 and 8 have a lower rigidity as compared with the center panel part 6.

That is, as is seen from FIG. 3, the inner panel 2 consists of two, that is, first and second panel elements "2A" and "2B" each having a stepped structure. That is, the first panel element "2A" comprises a base wall 6a, an inclined side wall 7 extending along the base wall 6a and a flange 7' extending along the side wall 7. The second panel element "2B" comprises a base wall 6b, an inclined side wall 8 extending along the base wall 6b and a flange 8' extending along the side wall 8. For joining the two panel elements "2A" and "2B", they are put together having the respective base walls 6a and 6b put on each other, and then spot-welding is applied to the mated base walls 6a and 6b. With this, as is seen from FIG. 2, the center panel part 6 of the inner panel 2 can have a double-layered structure. Thus, the center panel part 6 can have a higher rigidity and the side panel parts 7 and 8 have a lower rigidity than the center panel part 6.

The two side panel parts 7 and 8 are inclined relative to the center panel part 6 by substantially the same obtuse angle "α". That is, the side panel parts 7 and 8 are arranged substantially symmetrically.

In the following, a shock absorbing deformation of the front pillar "A-1", which occurs when a passenger collides hard against the pillar "A-1" due to a vehicle collision or the like, will be described with reference to FIGS. 2 and 5.

Figure 5:
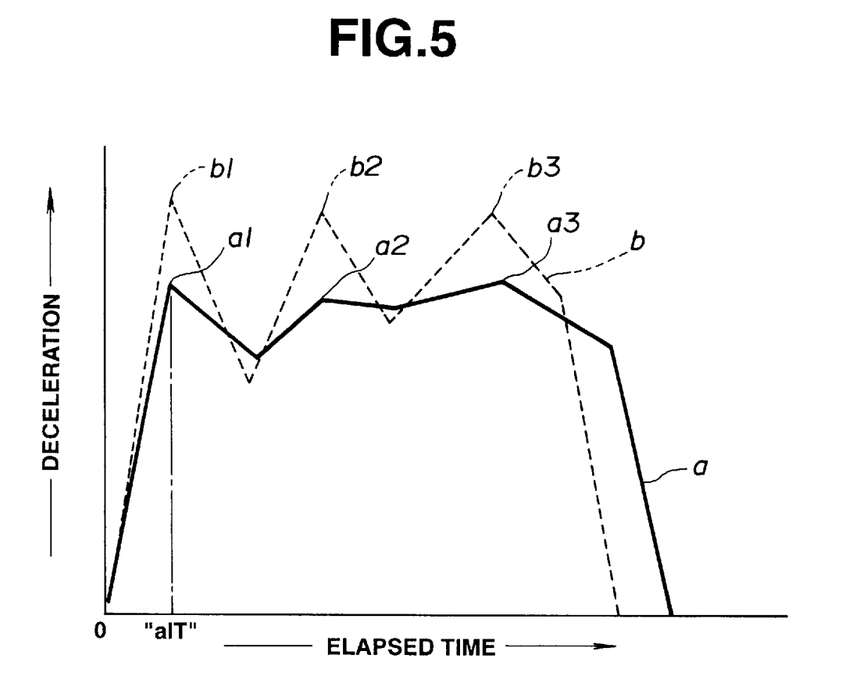
FIG. 5 is a graph depicting the deceleration characteristic (viz., shock absorbing characteristic) appearing when, due to a vehicle collision, a passenger collides against the framework.

The graph of FIG. 5 shows the deceleration curves "a" and "b" formed when the front pillar "A-1" of the first embodiment and a prior art front pillar (not shown) are deformed by a passenger upon a vehicle collision.

When, for example, the motor vehicle is subjected to a head-on collision, the passenger is forced to rush forward due to an inertia force then produced. When, as a result of the forward rush, the passenger (namely, his or her head) collides hard against the center panel part 6 of the front pillar "A-1", the impact force "FA" (see FIG. 2) applied to the center panel part 6 is instantly transmitted to the channel-shaped outer panel 1 through the two inclined side panel parts 7 and 8 of the inner panel 2. That is, as is understood from the part "0-a1" of the deceleration curve "a" of FIG. 5, at the initial stage of the passenger-to-front pillar collision, the deceleration rapidly increases until the time "a1T" when the front pillar "A-1" shows an initial deformation thereof. As is seen from the graph, the first peak "a1" of the deceleration is smaller than that "b1" of the deceleration of the prior art front pillar, which means that the shock applied to the passenger at such initial stage is smaller in case of the invention than in that in case of the prior art front pillar.

That is, at the time "a1T", the two side panel parts 7 and 8 are deformed exhibiting the initial deformation of the front pillar "A-1". After the initial deformation, the deceleration somewhat lowers and then increases and finally lowers to zero while forming two other peaks "a2" and "a3" thereof. These peaks "a2" and "a3" are smaller than those "b2" and "b3" of the prior art front pillar, so that the entire impact energy applied to the passenger by the collision is smaller in the present invention than in the prior art front pillar.

Because the two side panel parts 7 and 8 define substantially the same obtuse angle "α" relative to the center panel part 6, the deformation of the side panel parts 7 and 8 occurs simultaneously, which induces a smoothed shock absorbing effected by the front pillar "A-1".

Because the center panel part 6 has a higher rigidity due to its double-layered structure, the impact force applied thereto does not deform the same until it deforms the two side panel parts 7 and 8. This brings about a balanced and safe deformation of the front pillar "A-1", because the foremost part, that is, the center panel part 6, can keep its flat face and thus safe configuration or a certain period.

Figure 6:
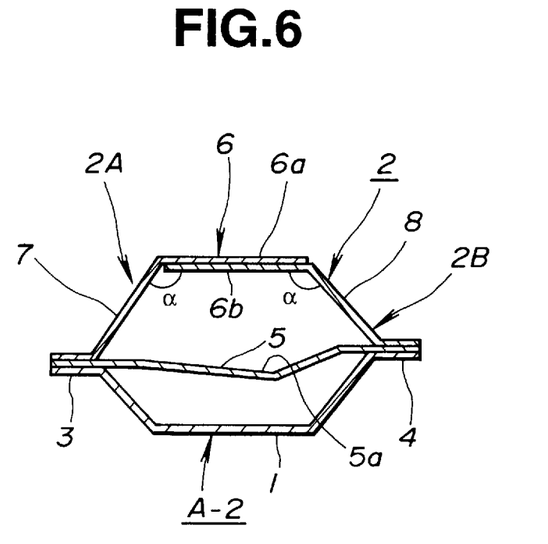
FIG. 6 is a view similar to FIG. 2, but showing a second embodiment of the present invention.
Figure 7:
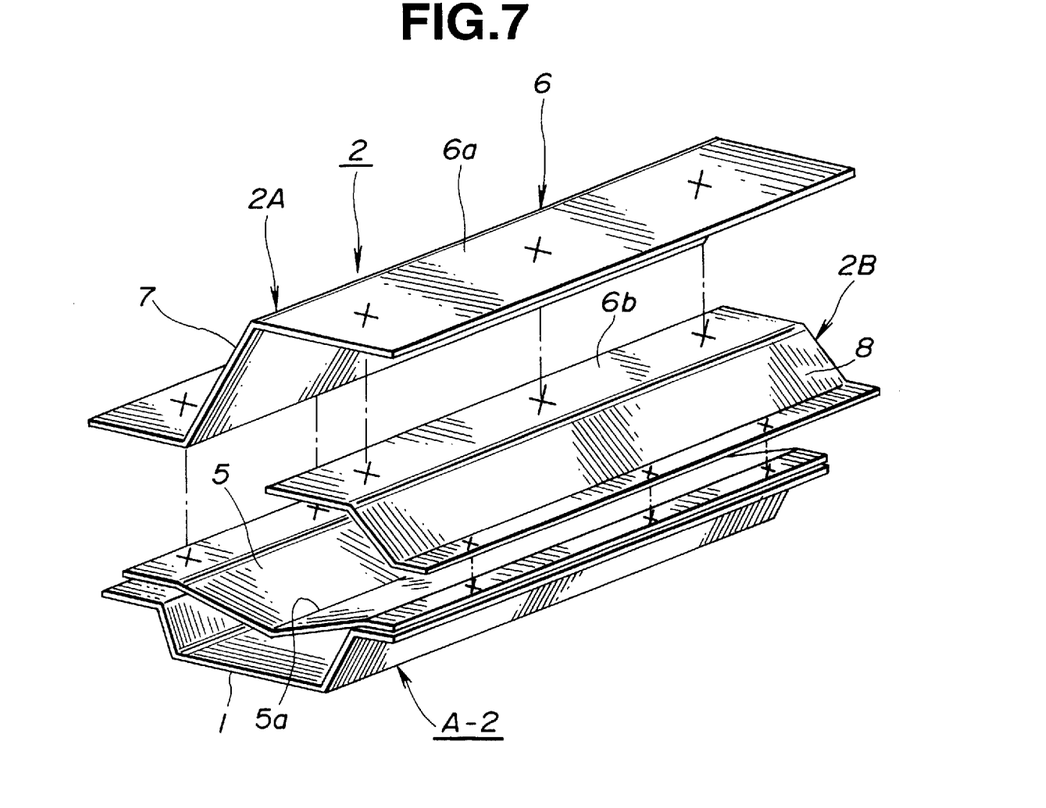
FIG. 7 is a view similar to FIG. 3, but showing the second embodiment.

Referring to FIGS. 6 and 7, there is shown a second embodiment of the present invention, which is a front pillar "A-2" of the vehicle body.

The front pillar "A-2" of the second embodiment is substantially the same as that of the above-mentioned first embodiment "A-1" except that in the second embodiment, a reinforcing steel plate 5 is further employed. That is, as is seen from the drawings, the reinforcing plate 5 is interposed between the outer panel 1 and the inner panel 2. More specifically, laterally opposed ends of the reinforcing plate 5 are each sandwiched between the flanges 3 and 4 of the outer and inner panels 1 and 2. Of course, the flanges 3 and 4 are spot-welded. The reinforcing plate 5 has a slightly bent portion 5a. Due to provision of the reinforcing plate 5, the flexural rigidity and torsional rigidity of the front pillar "A-2" are increased as compared with the first embodiment "A-1".

Also, in this second embodiment, the smoothed shock absorbing against the collision of the passenger against the front pillar "A-2" is mainly achieved by the two inclined side panel parts 7 and 8. That is, upon the collision, the initial deformation of the front pillar "A-2" is made by the side panel parts 7 and 8, like in the first embodiment "A-1".

Figure 8:
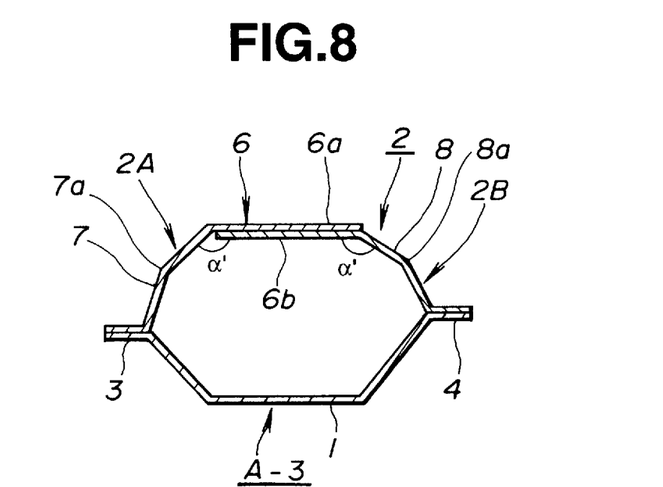
FIG. 8 is a view similar to FIG. 2, but showing a third embodiment of the present invention.
Figure 9:
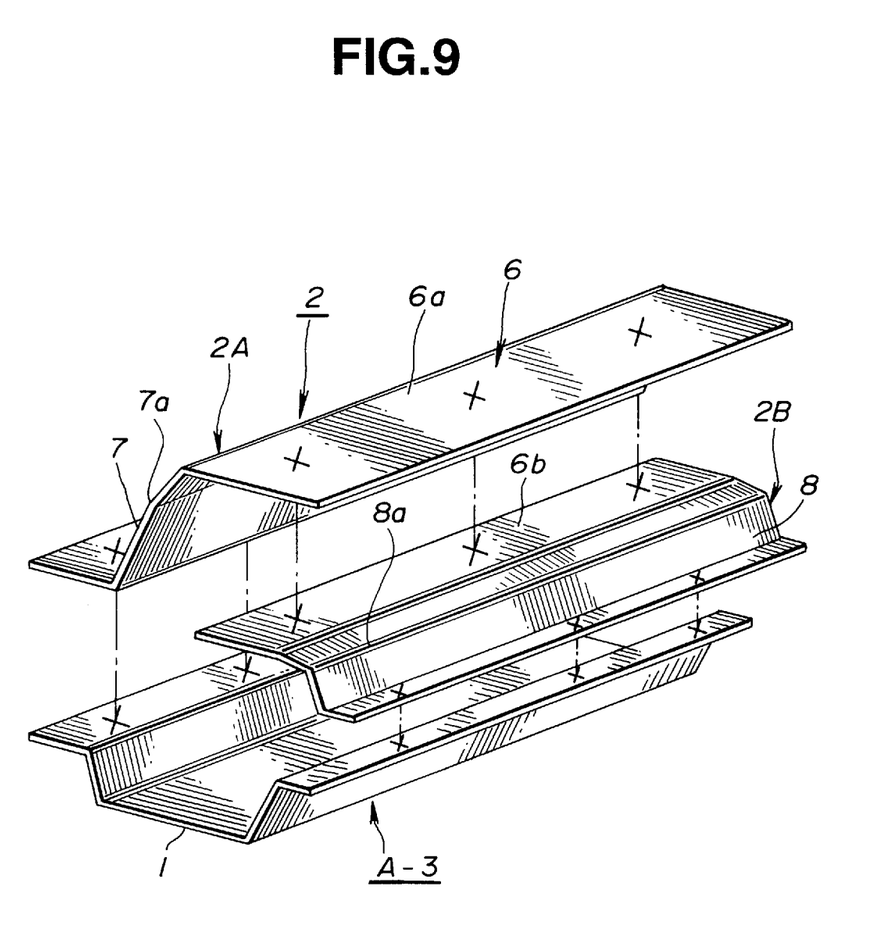
FIG. 9 is a view similar to FIG. 3, but showing the third embodiment.

Referring to FIGS. 8 and 9, there is shown a third embodiment "A-3" of the present invention.

The front pillar "A-3" of the third embodiment is substantially the same as the above-mentioned first embodiment "A-1" except that in the third embodiment, each of the side panel parts 7 and 8 is slightly bent at a middle portion. That is, as is seen from the drawings, each part 7 or 8 has an outwardly protruded bent portion 7a or 8a.

With these protruded bent portions 7a and 8b, the deformation of the side panel parts 7 and 8 is much easily and smoothly made as compared with the first embodiment "A-1".

Figure 10:
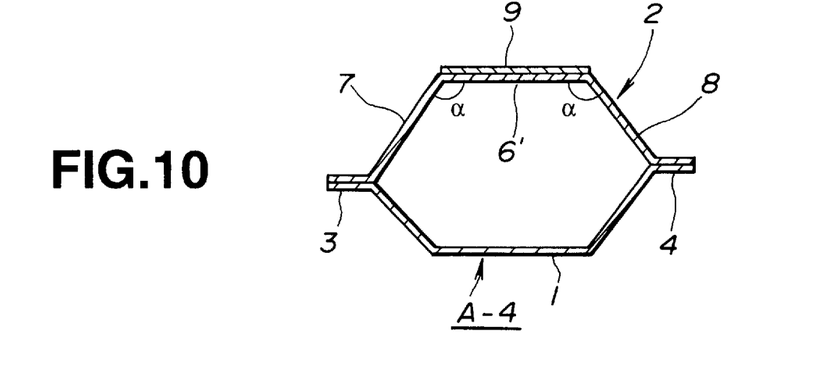
FIGS. 10 to 18 are views similar to FIG. 2, but showing fourth, fifth, sixth, seventh, eighth, ninth, tenth, eleventh and twelfth embodiments of the present invention, respectively.

Referring to FIG. 10, there is shown a fourth embodiment "A-4" of the present invention.

The front pillar "A-4" of this embodiment comprises an outer panel 1, an inner panel 2 and an elongate flat steel plate 9 welded to the inner panel 2. That is, the inner panel 2 is of a unitary part and comprises a center panel part 6' and two inclined side panel parts 7 and 8. The elongate flat panel 9 is spot-welded to an outer surface of the center panel part 6' of the inner panel 2 to reinforce the same. Because of the structure similar to the first embodiment "A-1", the shock absorbing manner of this fourth embodiment "A-4" is substantially the same as that of the first embodiment "A-1". The rigidity of the center panel part 6' can be adjusted by changing the thickness of the elongate flat plate 9 attached to the part 6'.

Figure 11:
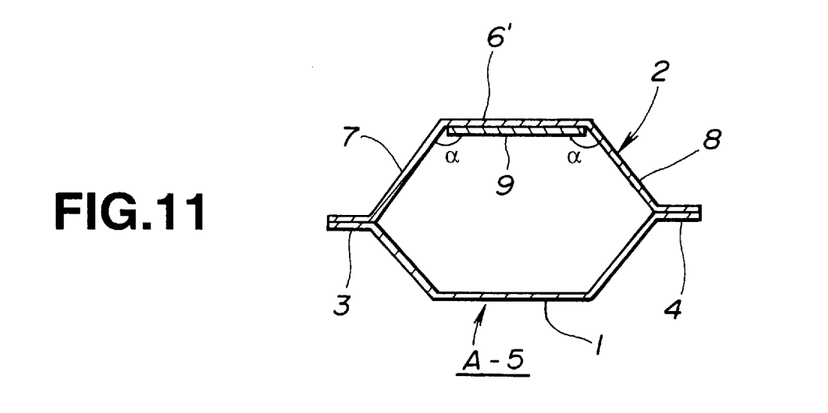

Referring to FIG. 11, there is shown a fifth embodiment "A-5" of the present invention.

In this embodiment "A-5", the elongate flat steel plate 9 is secured via spot welding to an inner surface of the center panel part 6' of the inner panel 2.

Figure 12:
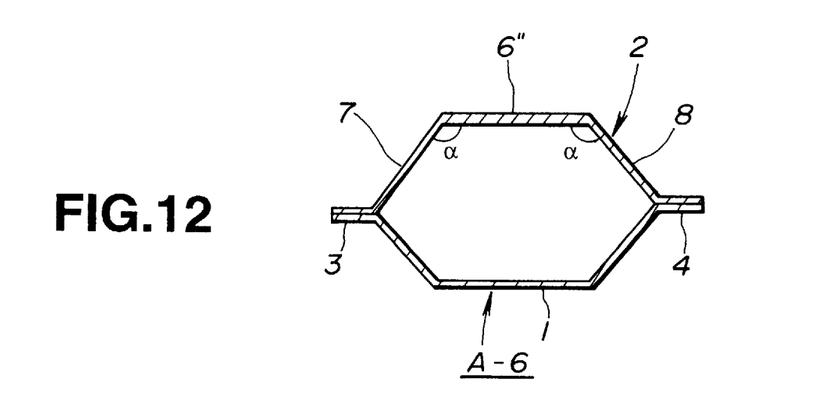

Referring to FIG. 12, there is shown a sixth embodiment "A-6" of the present invention.

In this embodiment "A-6", the center panel part 6" is formed thicker than the two side panel parts 7 and 8, as shown. Because of reduction in number of parts, the front pillar "A-6" of this embodiment can be produced with a simple assembling procedure. Furthermore, the center panel part 6" can have a better external appearance because the part 6" needs no spot-welding.

Figure 13:
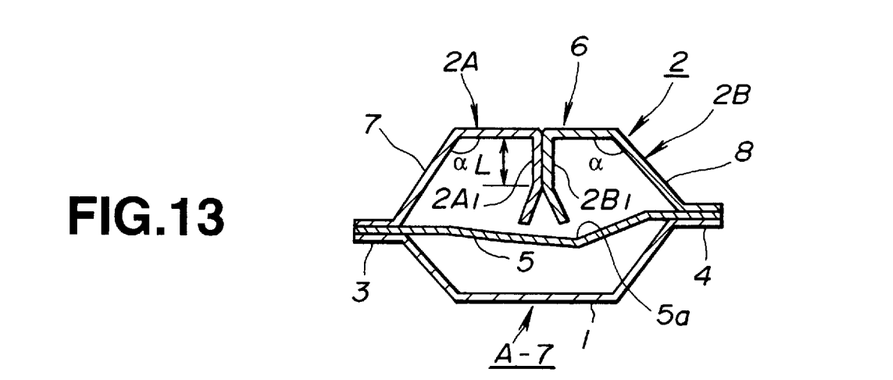

Referring to FIG. 13, there is shown a seventh embodiment "A-7" of the present invention.

The front pillar "A-7" of this embodiment comprises an outer panel 1, an inner panel 2 of a generally W-shaped cross section and a reinforcing steel plate 5. The inner panel 2 consists of two identical, that is, first and second identical panel elements "2A" and "2B" each having a generally U-shaped cross section. These two panel elements "2A" and "2B" are spot-welded at mutually facing wall portions "$2A_1$" and "$2B_1$" thereof in a so-called back-to-back manner, so that the joined panel elements "2A" and "2B" constitute the inner panel 2 having a generally W-shaped cross section as shown. The mated wall portions "$2A_1$" and "$2B_1$" are opened somewhat larger at their leading ends for the reason which will described hereinafter. Indicated by the reference "L" is the area where the spot-welded is applied.

The reinforcing steel plate 5 is interposed between the outer panel 1 and the inner panel 2 in-substantially the same manner as the afore-mentioned second embodiment (see FIG. 6).

When, due to a vehicle collision or the like, the passenger is forced to collide hard against the center panel part 6 of the front pillar "A-7", the inner panel part 6 is somewhat depressed at first. This depression movement of the inner panel part 6 continues until the leading ends of the mated wall portions "$2A_1$" and "$2B_1$" abut against the reinforcing steel plate 5. Upon the abutment, the impact force applied to the center panel part 6 is instantly transmitted to the outer panel 1 and thus to the entire construction of the front pillar "A-7", exhibiting an initial peak of the deceleration. Then, the two side panel parts 7 and 8 are largely deformed lightening the deceleration. It is to be noted that the abutment of the leading ends of the mated wall portions "$2A_1$" and "$2B_1$" against the reinforcing steel plate 5 induces a gradual bending of the leading ends in outward directions, which promotes the smoothed shock absorbing effected by the pillar "A-7". By changing the length "L" of the welded area, the shock absorbing manner can be varied.

Figure 14:
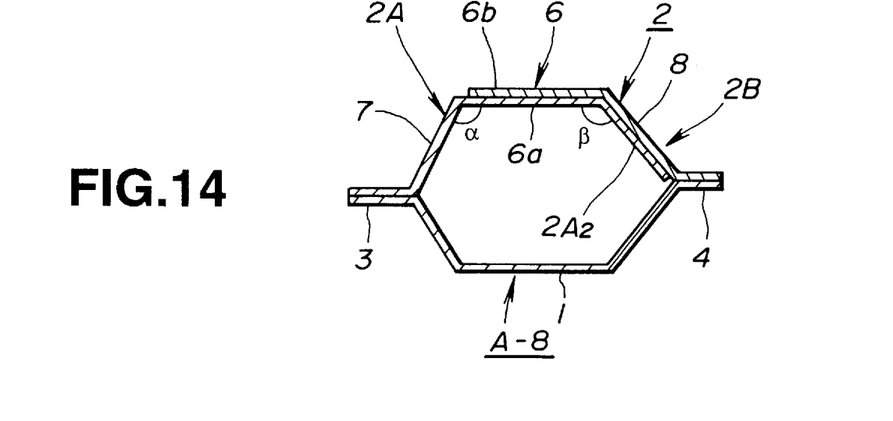

Referring to FIG. 14, there is shown an eighth embodiment "A-8" of the present invention.

The channel-like inner panel 2 of this embodiment consists of two, that is, first and second panel elements "2A" and "2B" which are partially overlapped in an after-mentioned manner. The first panel element "2A" comprises a center panel part 6a, two inclined side panel parts 7 and "$2A_2$" and a flange 3, while the second panel element "2B" comprises a center panel part 6b, an inclined side panel part 8 and a flange 4. Upon assembly, the center panel part 6a and the inclined side panel part 8 of the second panel element "2B" are respectively put on the center panel part 6a and one inclined side panel part "$2A_2$" of the first panel element "2A", and they are spot-welded. The angle "$\alpha$" defined between the side panel part 7 and the center panel part 6 is smaller than that "$\beta$" defined between the other side panel part 8 and the center panel part 6.

The front pillar "A-8" of this eighth embodiment is suitable for vehicle bodies of a type wherein by a reason in designing, it is impossible to symmetrically arrange the two side panel parts 7 and 8 like in the afore-mentioned first embodiment "A-1" (see FIG. 2). Because the "$\beta$"-angled portion of the first panel part "2A" is lined with the second panel element "2B", the crash-resistance of the "$\beta$"-angled portion is balanced with that of the "$\alpha$"-angled portion. In general, in case of a single element, a greater angled portion like the "$\beta$"-angled portion has a small crash-resistance as compared with a smaller angled portion like the "$\alpha$"-angled portion. That is, the unbalanced crash-resistance between the two portions is compensated by providing the center panel part 6 with the side panel part 8.

With this construction, the deformation of the side panel parts 7 and 8 occurs simultaneously, which brings about a smoothed shock absorbing effected by the front pillar "A-8".

Figure 15:
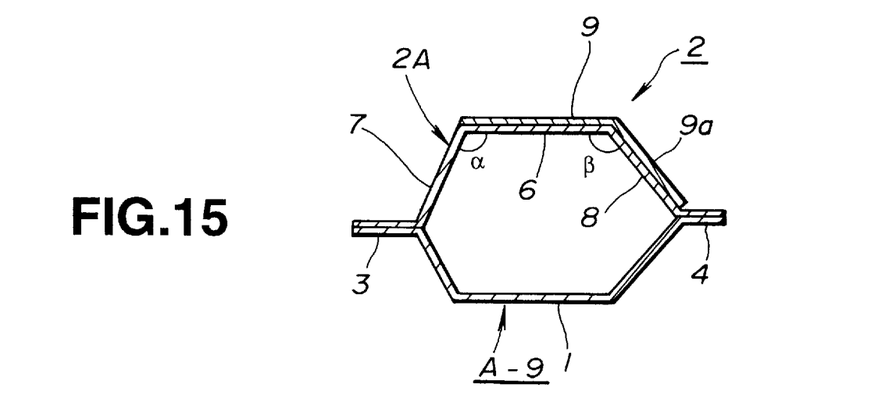

Referring to FIG. 15, there is shown a ninth embodiment "A-9" of the present invention.

The front pillar "A-9" of this embodiment is substantially the same as that of the above-mentioned eighth embodiment "A-8" except that in the ninth embodiment, a reinforcing bent plate 9 is employed in place of the second panel element "2B". The reinforcing bent plate 9 comprises a center panel part lined on an outer surface of the center panel part 6 of the major panel element 2A and an inclined side panel part 9a lined on an outer surface of the side panel part 8 of the major panel element 2A.

Due to the same reason as mentioned in the eighth embodiment "A-8" of FIG. 14, deformation of the front pillar "A-9" is smoothly effected upon the collision of the passenger against the inner panel 2.

Figure 16:
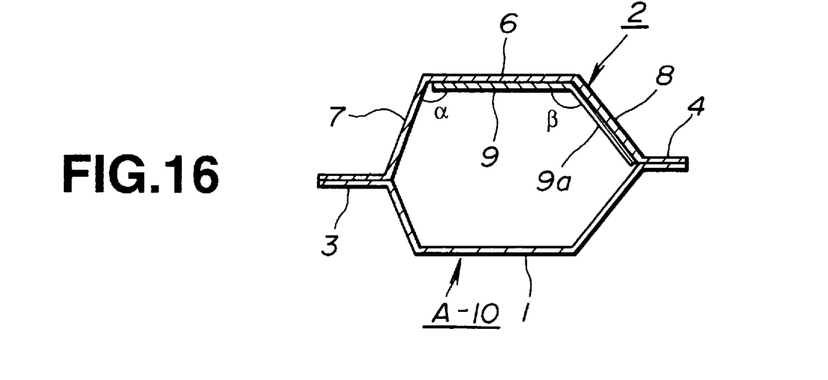

Referring to FIG. 16, there is shown a tenth embodiment "A-10" of the present invention.

The front pillar "A-10" of this embodiment is substantially the same as that of the above-mentioned ninth embodiment "A-9" except that in the tenth embodiment, the reinforcing bent plate 9 is lined on an inner surface of the major panel element "2A".

Figure 17:
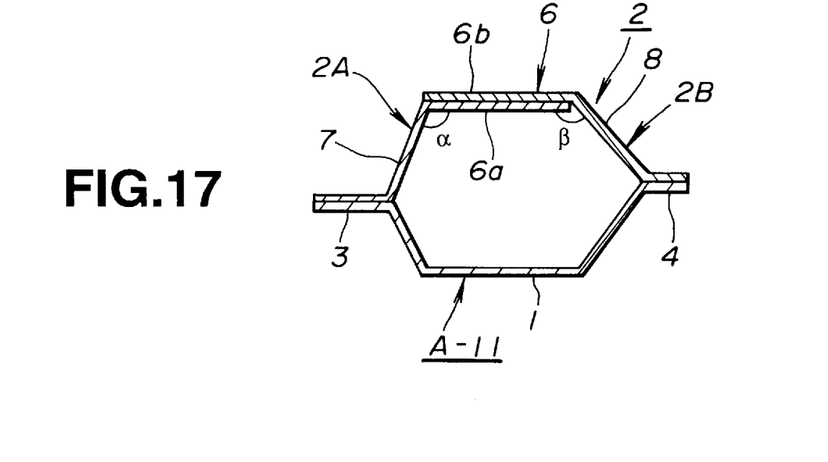

Referring to FIG. 17, there is shown an eleventh embodiment "A-11" of the present invention.

The front pillar "A-11" of this embodiment is substantially the same as that of the above-mentioned eighth embodiment "A-8" of FIG. 14 except for the followings.

That is, in the eleventh embodiment "A-11", the thickness of the second panel element "2B" is greater than that of the first panel element "2A", and there is no part corresponding to the side panel part "$2A_2$" of the first panel element "2A" of the eighth embodiment "A-8".

Figure 18:
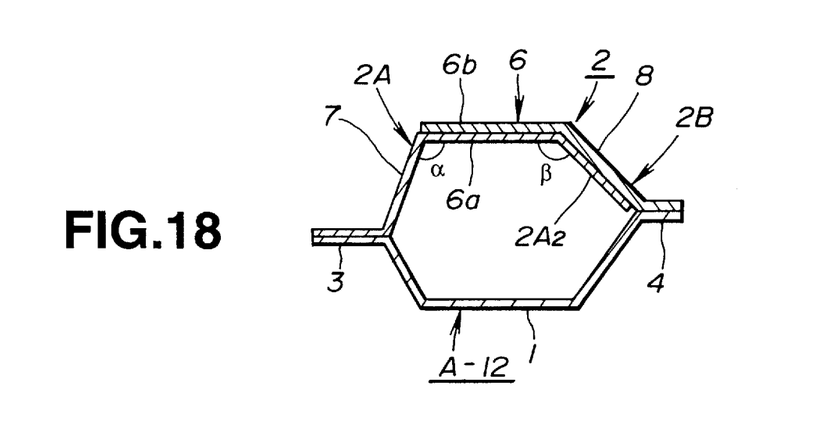

Referring to FIG. 18, there is shown a twelfth embodiment "A-12" of the present invention.

The front pillar "A-12" of this embodiment is substantially the same as that of the eleventh embodiment "A-11" except that in the twelfth embodiment "A-12", the first panel element "2A" has an inclined side panel part "$2A_2$" attached to an inner surface of the side panel part 8 of the second panel element "2B".

Figure 19:
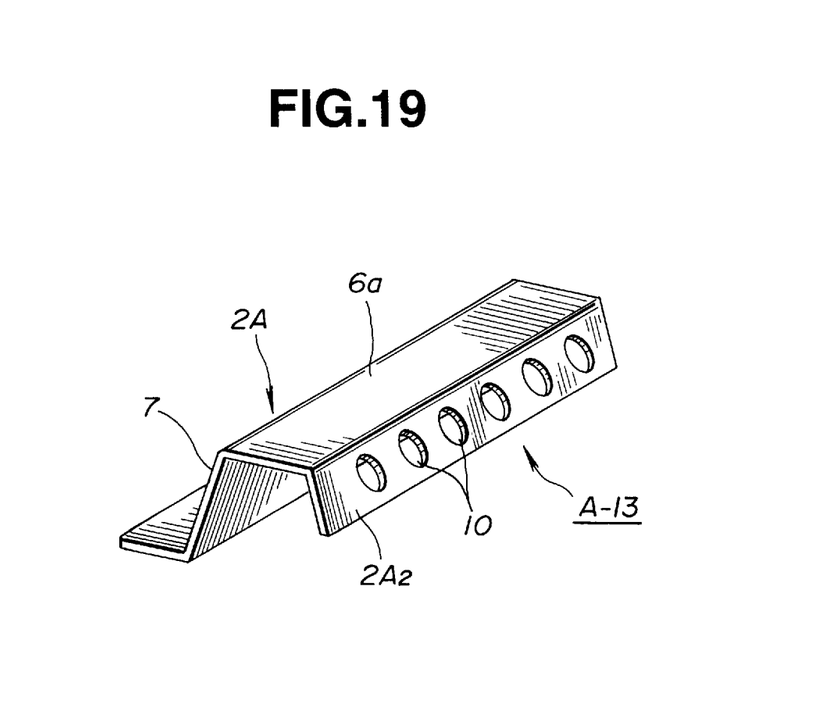
FIG. 19 is a perspective view of a first panel element employed in a framework of a thirteenth embodiment of the present invention.

Referring to FIG. 19, there is shown a first panel element "2A" used in a front pillar of a thirteenth embodiment "A-13" of the present invention. In fact, the front pillar "A-13" of this embodiment is a modification of that of the above-mentioned eighth embodiment "A-8" (FIG. 14) or twelfth embodiment "A-12" (FIG. 18).

That is, as is seen from the drawing, the inclined side panel part "$2A_2$" of the first panel element "2A" is formed with a plurality of circular openings 10. With these openings 10, the rigidity of the side panel part "$2A_2$", that is, the rigidity of the side panel part 8 (see FIG. 14) can be adjusted.

Figure 20:
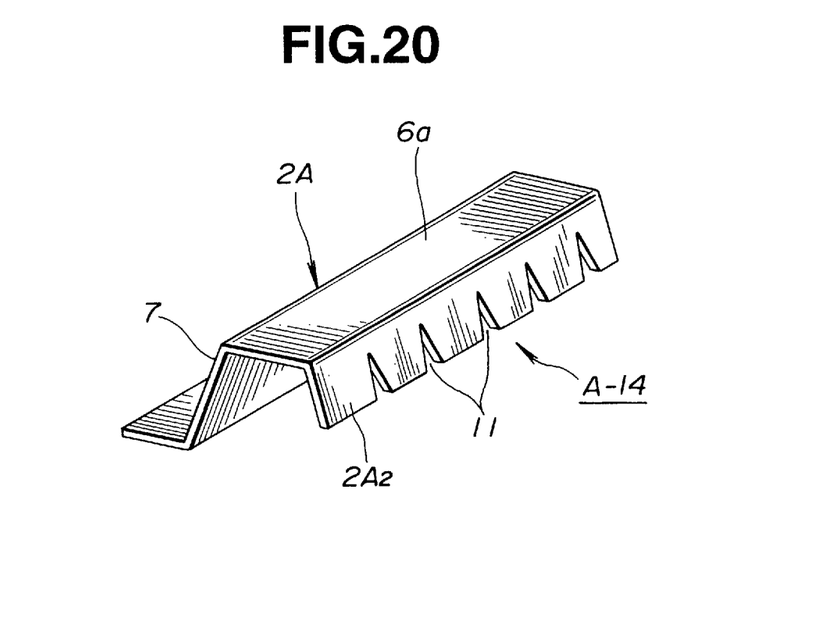
FIG. 20 is a view similar to FIG. 19, but showing a first panel element employed in a fourteenth embodiment of the present invention.

Referring to FIG. 20, there is shown a first panel element "2A" used in a front pillar of a fourteenth embodiment "A-14" of the present invention.

In this embodiment, the inclined side panel part. "$2A_2$" of the first panel element "2A" is formed with a plurality of notches 11 for adjusting the rigidity of the part "$2A_2$".

Figure 21:
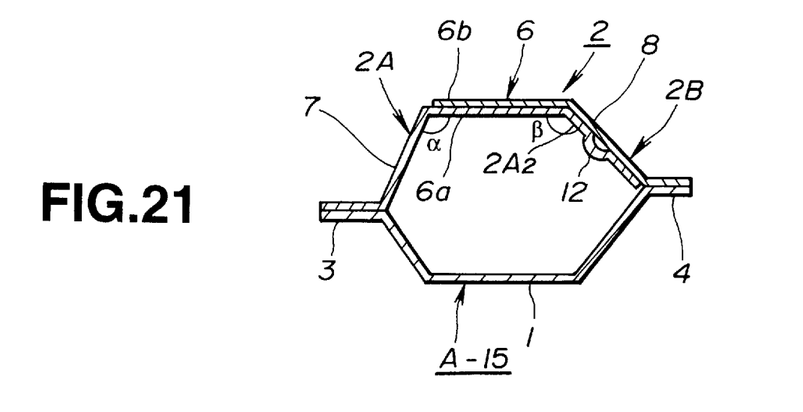
FIGS. 21 to 23 are views similar to FIG. 2, but showing fifteenth, sixteenth and seventeenth embodiment of the present invention, respectively.

Referring to FIG. 21, there is shown a fifteenth embodiment "A-15" of the present invention, which is a front pillar of the vehicle body.

The front pillar "A-15" of this embodiment is substantially the same as that of the aforementioned eighth embodiment "A-8" of FIG. 14 except that in the fifteenth embodiment "A-15", the inclined side panel part "$2A_2$" of the first panel element "2A" is formed with a plurality of beads 12 each projecting inward, as shown. With these beads 12, the rigidity of the side panel part 8 can be adjusted.

Figure 22:
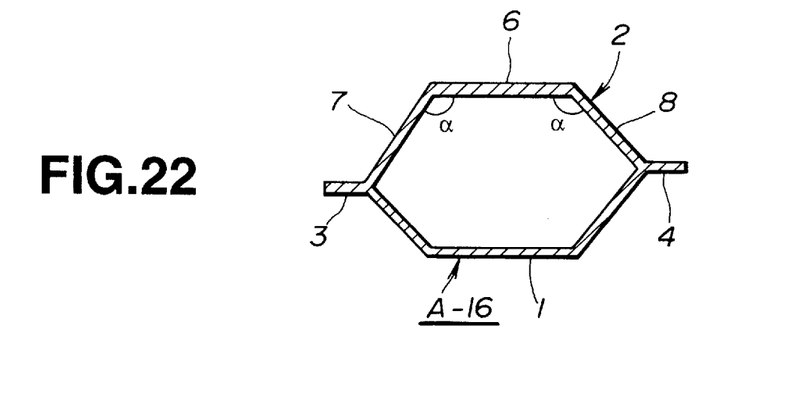

Referring to FIG. 22, there is shown a sixteenth embodiment "A-16" of the present invention, which is a front pillar of the vehicle body.

The front pillar "A-16" of this embodiment is of a one-body structure constructed of aluminum. That is, this embodiment is used in a case wherein the vehicle body is constructed of aluminum. The center panel part 6, which is to face toward the interior of the vehicle body, is formed thicker than the remaining portions 7 and 8.

Figure 23:
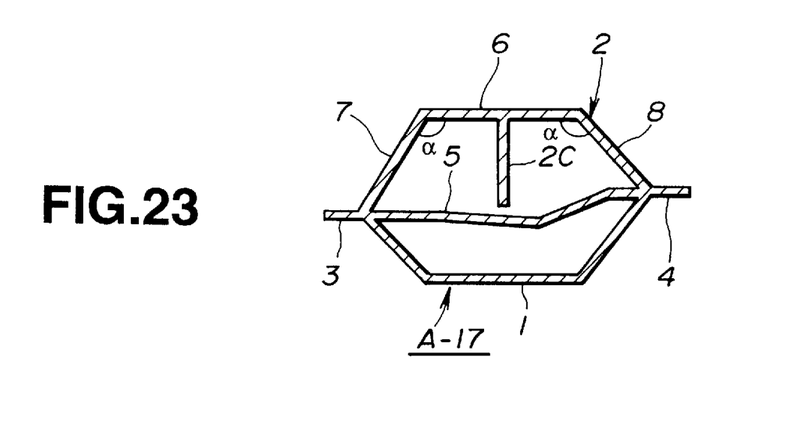

Referring to FIG. 23, there is shown a seventeenth embodiment "A-17" of the present invention.

Like the above-mentioned sixteenth embodiment "A-16", the front pillar "A-17" of this seventeenth embodiment is of a one-body structure constructed of aluminum. Similar to the afore-mentioned seventh embodiment "A-7" (FIG. 13), a reinforcing plate 5 and a flange 2C are employed.

Although the above description is directed to only the front pillar "A", the present invention is applicable to the center pillar "B", the rear pillar "C" and the roof rail "D".

In the following, advantageous shock absorbing manner achieved by the present invention will be described with reference to the drawings.

In the framework of the present invention, two side panel parts 7 and 8 (see FIG. 1) extend obliquely from laterally opposed edges of the center panel part 6 formed flat and faces toward the interior of the vehicle body. Thus, when, due to a vehicle collision or the like, the passenger is forced to collide hard against the inner panel 2, the two inclined side panel parts 7 and 8 are easily deformed while optimally absorbing the impact shock applied to the inner panel 2, in such a manner as has been described hereinafore.

When, as in the second embodiment "A-2" of FIG. 6, a reinforcing plate 5 is added, the rigidity of the pillar is increased without sacrificing the desired shock absorbing ability of the two side panel parts 7 and 8.

When, as in the third embodiment "A-3", the two side panel parts 7 and 8 have somewhat bent portions 7a and 8a, the shock absorbing ability of the inner panel 2 is increased.

When, as in the seventh embodiment "A-7" of FIG. 13, a reinforcing plate 5 and a center flange ($2A_1+2B_1$) are added, the shock absorbing ability of the pillar is much increased.

Even when, like in the eighth, ninth, tenth, eleventh and twelfth embodiments "A-8", "A-9", "A-10", "A-11" and "A-12", the two side panel parts 7 and 8 fail to have the same angle "α" relative to the center panel part 6, unbalanced deformation of them can be avoided by only attaching an extra plate member to one side panel part 7 or 8 that defines a larger angle "β" relative to the center panel part 6.

When, like in the thirteenth, fourteenth and fifteenth embodiments "A-13", "A-14" and "A-15", one element "2A" of the inner panel 2 is formed with openings 10, notches 11 or beads 12, the rigidity of the inner panel 2 can be easily adjusted.

What is claimed is:

1. A framework of a vehicle body structure, comprising:
    a front pillar inclined rearwardly toward a front seat, the front pillar comprising:
        an outer panel; and
        an inner panel joined with said outer panel to constitute a longitudinally extending hollow structure, said inner panel including a flat center panel part adapted to face toward the interior of said vehicle body structure, and first and second side panel parts each extending obliquely outwardly from laterally opposed edges of said center panel part at an oblique angle relative to the center panel part,
    wherein the inner and outer panels are connected at laterally opposed edges thereof,
    wherein said first and second side panel parts and said center panel part of said inner panel each have a uniform thickness,
    wherein said center panel part of said inner panel is positioned so that a head of a person sitting in the front seat faces said center panel part,
    wherein said center panel part of the inner panel is thicker than either of said first and second side panel parts so that the rigidity of the center panel part is higher than each of said first and second side panel parts due to the greater thickness thereof, and
    wherein the higher rigidity of the center panel part causes the first and second side panel parts to deform before the center panel part upon impact to the center panel part from the interior of the vehicle body.

2. A framework of a vehicle body structure as claimed in claim 1, wherein said inner panel comprises first and second panel elements partially overlapped and welded to form a double-layered structure, said double-layered structure constituting a reinforcement of said center panel part of said inner panel that is thicker than either of said first and second panel parts and produces a higher rigidity than said first and second side panel parts.

3. A framework of a vehicle body structure as claimed in claim 1, wherein said center panel part of said inner panel is lined with a reinforcing plate to increase the rigidity thereof.

4. A framework of a vehicle body structure as claimed in claim 2, further comprising a reinforcing panel interposed between said outer panel and said inner panel, longitudinally dividing the interior of said longitudinally extending hollow structure into two chambers.

5. A framework of a vehicle body structure as claimed in claim 1, wherein said first and second side panel parts of said inner panel have substantially the same obtuse angle relative to said center panel part.

6. A framework of a vehicle body structure as claimed in claim 2, wherein said first and second side panel parts of said inner panel each have an outwardly protruded bent portion to facilitate deformation thereof.

7. A framework of a vehicle body structure as claimed in claim 2, wherein the obtuse angle defined between said first side panel part and said center panel part is smaller than that defined between said second side panel part and said center panel part.

8. A framework of a vehicle body structure as claimed in claim 7, wherein the thickness of said second panel element is greater than that of said first panel element.

9. A framework of a vehicle body structure as claimed in claim 1, wherein each of said first and second side panel parts joins said center panel part to form a longitudinally extending deformation starting portion that deforms first when the first and second side panel parts are subjected to deformation, and wherein said longitudinally extending deformation starting portion induces collapsing of said first and second side panel parts while maintaining the shape of each of said first and second side panel parts and said center panel part.

10. A framework of a vehicle body structure, comprising:
a front pillar inclined rearwardly toward a front seat, the front pillar comprising:
an outer panel; and
an inner panel joined with the outer panel to constitute a longitudinally extending hollow structure, the inner panel including a flat center panel part adapted to face toward the interior of the vehicle body structure, and first and second side panel parts each extending obliquely outwardly from laterally opposed edges of the center panel part at an oblique angle relative to the center panel part,
wherein the inner and outer panels are connected at laterally opposed edges thereof,
wherein the first and second side panel parts and the center panel part of the inner panel each have a uniform thickness,
wherein the center panel part of the inner panel is positioned so that a head of a person sitting in the front seat faces said center panel part,
wherein the center panel part of the inner panel is thicker than either of the first and second side panel parts so that the rigidity of the center panel part is higher than each of the first and second side panel parts due to the greater thickness thereof,
wherein each of the first and second side panel parts joins the center panel part to form a longitudinally extending deformation starting portion that deforms first when the first and second side panel parts are subjected to deformation upon impact of the person's head to the center panel part from the interior of the vehicle body in a direction substantially perpendicular to the center panel part, and
wherein the longitudinally extending deformation starting portion induces collapsing of the first and second side panel parts while maintaining the shape of each of the first and second side panel parts and the center panel part.

11. A framework of a vehicle body structure as claimed in claim 10, wherein the inner panel comprises first and second panel elements partially overlapped and welded to form a double-layered structure, the double-layered structure constituting a reinforcement of the center panel part of the inner panel that is thicker than either of the first and second panel parts and produces a higher rigidity than the first and second side panel parts.

12. A framework of a vehicle body structure as claimed in claim 10, wherein the center panel part of the inner panel is lined with a reinforcing plate to increase the rigidity thereof.

13. A framework of a vehicle body structure as claimed in claim 11, further comprising a reinforcing panel interposed between the outer panel and the inner panel, longitudinally dividing the interior of the longitudinally extending hollow structure into two chambers.

14. A framework of a vehicle body structure as claimed in claim 10, wherein the first and second side panel parts of the inner panel have substantially the same obtuse angle relative to the center panel part.

15. A framework of a vehicle body structure as claimed in claim 11, wherein the first and second side panel parts of the inner panel each have an outwardly protruded bent portion to facilitate deformation thereof.

16. A framework of a vehicle body structure as claimed in claim 11, wherein the obtuse angle defined between the first side panel part and the center panel part is smaller than that defined between the second side panel part and the center panel part.

17. A framework of a vehicle body structure as claimed in claim 16, wherein the thickness of the second panel element is greater than that of the first panel element.

18. A framework of a vehicle body structure, comprising:
a front pillar inclined rearwardly toward a front seat, the front pillar comprising:
an outer panel; and
an inner panel joined with the outer panel to constitute a longitudinally extending hollow structure, the inner panel including a flat center panel part adapted to face toward the interior of the vehicle body structure, and first and second side panel parts each extending obliquely outwardly from laterally opposed edges of the center panel part at an oblique angle relative to the center panel part,
wherein the inner and outer panels are connected at laterally opposed edges thereof,
wherein the center panel part of the inner panel is thicker than either of the first and second side panel parts so that the rigidity of the center panel part is higher than each of the first and second side panel parts due to the greater thickness thereof,
wherein the higher rigidity of the center panel part causes the first and second side panel parts to deform before the center panel part upon impact to the center panel part from the interior of the vehicle body, and
wherein the first and second side panel parts of the inner panel each have an outwardly protruded bent portion to facilitate deformation thereof.

* * * * *